United States Patent [19]

Good

[11] Patent Number: 4,569,509

[45] Date of Patent: Feb. 11, 1986

[54] VISE, PARTICULARLY A MACHINE VISE

[76] Inventor: Johann Good, Feldackerstrasse 25, CH-8887 Mels, Switzerland

[21] Appl. No.: 595,742

[22] Filed: Apr. 2, 1984

[51] Int. Cl.[4] .................................................. B23Q 3/00

[52] U.S. Cl. ........................................ 269/32; 269/136; 269/246

[58] Field of Search ................................ 269/134–136, 269/138, 285, 283, 246, 244, 250, 32, 238

[56] References Cited

U.S. PATENT DOCUMENTS

| | | | |
|---|---|---|---|
| 2,417,625 | 3/1947 | Bates | 269/32 |
| 3,672,660 | 6/1972 | Jagob | 269/203 |
| 4,042,264 | 8/1977 | Shumer | 269/203 |
| 4,078,782 | 3/1978 | Carlson | 269/283 |
| 4,223,879 | 9/1980 | Wolfe et al. | 269/32 |
| 4,295,641 | 10/1981 | Boucher | 269/285 |

FOREIGN PATENT DOCUMENTS

| | | | |
|---|---|---|---|
| 65043 | 5/1980 | Japan | 269/285 |

*Primary Examiner*—Robert C. Watson

*Attorney, Agent, or Firm*—Marmorek, Guttman & Rubenstein

[57] ABSTRACT

A vise adapted to clamp a workpiece includes a support which has a slide surface, first and second jaws movable with respect to one another, and operable to clamp the workpiece, and wherein at least one jaw is slidable along the slide surface. A drive element is in driving connection with at least one jaw so as to at least move that jaw into engagement with the workpiece, and a drive mechanism is operable to drive the drive element. A stressing mechanism is provided for pressing the jaw against the slide surface upon the drive element driving the jaw into engagement with the workpiece.

28 Claims, 6 Drawing Figures

VISE, PARTICULARLY A MACHINE VISE

BACKGROUND OF THE INVENTION

The invention relates to a vise, particularly to a machine vise, including two jaws movable relative to one another, and drive means operable to act on one jaw through a drive element, so as to move the jaws for clamping a workpiece, or releasing a workpiece from a clamped position on a slide surface of a support.

In known vises of this type one jaw is stationary, while the other jaw may be moved on a guide by means of a spindle or other arrangement, so as to grip and hold the workpiece. In such a mechanism it is practically unavoidable that a play occurs between the jaw and the guide, so that the jaw has the tendency to be lifted somewhat from the guide during any clamping action. This has the disadvantage, however, that the accuracy of operating on the workpiece is influenced thereby.

SUMMARY OF THE INVENTION

It is therefore an object of the present invention to devise a vise of the aforesaid kind, in which no play arises between the jaw and the guide or the support of the jaw.

This object is attained, according to the invention, by providing stressing means for pressing the driven jaw against the slide surface of the support during any clamping movement. Hence when the jaw is moved, it is pressed against the slide surface of the support, so that the jaw is not slightly lifted, as is the case in conventional vises. By this means a reliable and secure clamping of the workpiece is attained According to one version of the invention, the drive element is a lever disposed in the support and coupled to the jaw, so that the lever assumes a position substantially at right angles to the slide surface, when in the rest position. Due to this construction one would have to expect that a point of the lever which is at the same level as the slide surface, when the lever is situated in the rest position, will define a circular trajectory which extends tangentially to the slide surface, upon the lever being rotated. Because of this circular movement, the jaw is pressed the more strongly against the slide surface, the more it is moved by the lever, so that any play between the jaw and the slide surface is reliably avoided.

The lever may occupy a neutral position in the rest position, and may press the driven jaw against the slide surface, when the lever is moved away from the neutral position in one direction, or in a direction opposite to that one direction. Such a neutral position occurs when the lever subtends substantially a right angle with the slide surface in the rest position. This face can be made use of by utilizing the vise both for clamping a workpiece on its exterior, as well as clamping it on interior portions thereof. When using interior clamping, the jaws of the vise, which are optionally provided with add-on members, are moved away from one another, so that the add-on members can, for example, grasp a ring from the interior.

It is advantageous if the lever is a double-armed lever. This permits utilization of the space in the interior of the support, so as to attain an adyantageous lever transmission ratio, and so as to make use of the elasticity of the lever for the purpose of clamping the workpiece. A particularly advantageous construction results if an angle lever is employed, which uses the available space efficiently. It is then possible to employ coupling transmission means interposed between the drive transmission means and the drive element, namely the angle lever, so as to transmit the drive force from the drive transmission means to the drive element. This permits employment of a further force transmission ratio, so that a relatively low driving force is adequate to generate a sufficiently large clamping force.

At least one of the transmission means advantageously includes self-braking means. If no driving force is available, then the elastic deformation of the drive element, namely for example of the angle lever, maintains the clamping force of the clamping jaw.

In an advantageous version of the invention the coupling transmission means includes two sliders disposed on respective opposite sides of the drive element, and a first set of rollers arranged on the support, and wherein the sliders operatively travel on the first set of rollers. Here each slider is formed with a longitudinal slit, which subtends an acute angle with the slide surface, and wherein a second set of rollers disposed on the drive element is in engagement with the longitudinal slit. This results in a self-braking design, in which only the drive transmission means, but not the drive element can move the sliders. This self-braking action can be further increased, if glide members or glide pins are substituted for the second set of rollers. This makes it possible for the drive transmission means, for example for the pneumatic cylinder, to be disconnected from the supply source, for example a source of compressed air, following the clamping action, so as to transport the vise, for example, from one processing machine to another, without having to release the clamped workpiece. This also permits modular construction on machine centers. Advantageously two selectably actuatable locking means are provided to limit the path of the coupling transmission means. Depending on whether the vise is used to clamp the workpiece on exterior or interior portions thereof, one or the other locking means is used.

The lever may be coupled to the jaw by means of a rotatable pin. Coupling of the lever to the jaw by means of a ball-and-socket joint is, however, more advantageous. This permits matching of the jaw to any non-parallel workpiece. The jaw may therefore execute not only a to and fro movement, but also a rotational movement about an axis at right angles to the slide surface of the support. If it is, however, desired, that the jaw should not be able to rotate, or if rotation of the jaw should at least be limited, rotation restraining or limiting means, for example positioning screws, can be provided for restraining, or at least limiting rotation of the jaw on the slide surface, or on the support.

The support is advantageously adapted to be filled with oil, so that the drive transmission means, its support, as well as the sliders are constantly operating in an oil bath. Advantageously the slide surface of the support and/or the abutting surface of the jaw is formed with at least one recess, in which sealing means are received. This sealing means prevents escape of any oil between the slide surface and the jaw. A pneumatic cylinder serves advantageously as drive transmission means. But other drive transmission means are also conceivable, for example an electromagnet, or an electric motor. But as in most cases compressed air is available, a pneumatic cylinder constitutes a particularly simple drive transmission means. Here the piston rod has the advantage that it acts as an oil pump, so as to squeeze oil from the support onto the jaw, and thus to lubricate the slide surface. So as to control the pneumatic cylinder, there may be provided a control slider which has at least first and second positions, which controls the drive of the pneumatic cylinder so that the jaws are moved in one position away from one another, and moved in the other position towards one another. But the control slider may also have a third position, in which the pneumatic cylinder is controllable by a four-way valve.

Each jaw may be formed with bores arranged in a predetermined pattern on the front side and on the top side thereof, and wherein each bore has a predetermined diameter along a portion of its length, and is formed with an inner thread along at least a portion of the remainder of the length; additionally a second set of jaws may be provided, as well as fastening means, such as fastening screws or sleeves and attachment screws slidable thereinto, which match the formation of the bores for fastening the second set of jaws to the first set of jaws, respectively. This arrangement permits a particularly universal and efficient use of the vise. But it is also possible to provide the underside of the support with bores arranged in a predetermined pattern, so that it can be mounted on a baseplate or the like.

BRIEF DESCRIPTION OF THE DRAWINGS

For a fuller understanding of the nature and objects of the invention, reference should be had to the following detailed description, taken in connection with the drawings, in which.

DESCRIPTION OF THE PREFERRED EMBODIMENTS

Figure 1:
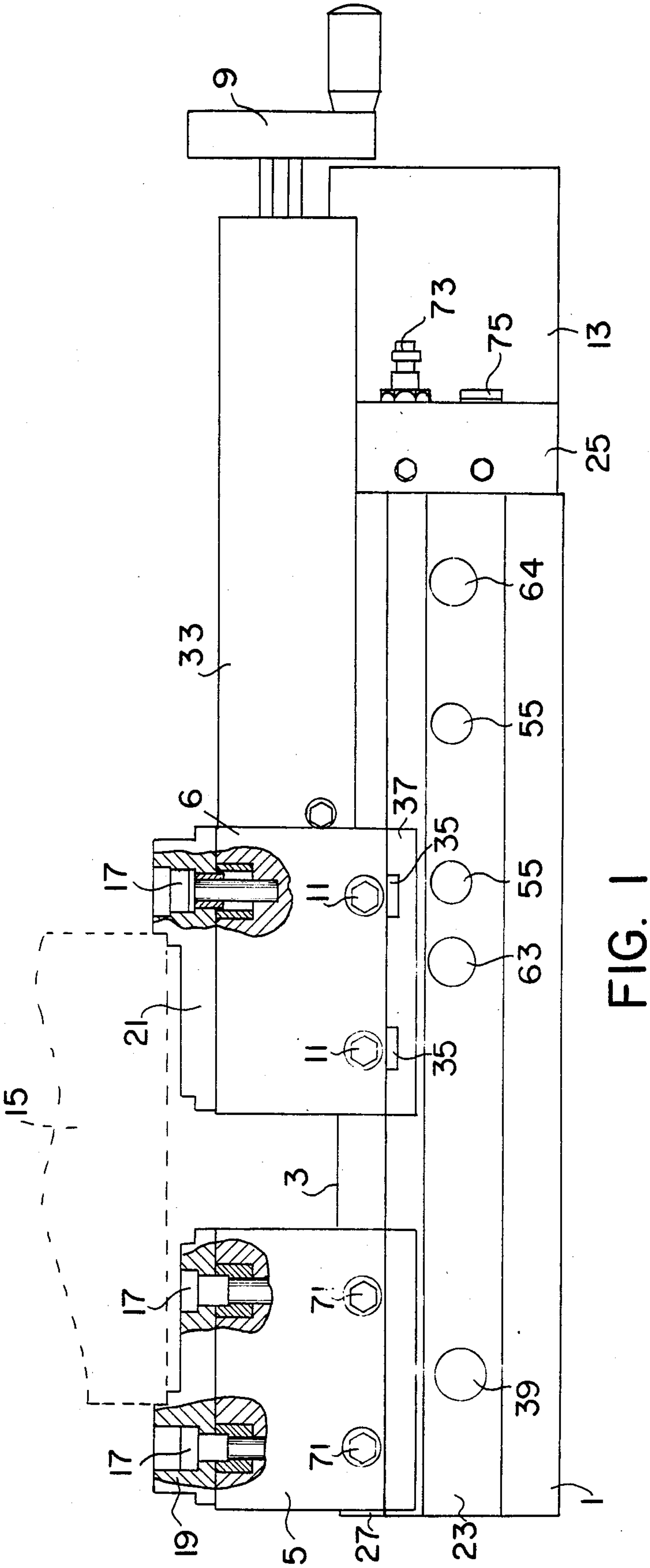
FIG. 1 is a side elevation view of the vise, according to the invention, including jaws mountable thereon for clamping on a work piece on external sides of the workpiece.

Referring now to the drawing, and as is shown, for example, in FIG. 1, the vise, according to the invention, consists substantially of a support 1 formed with a sliding surface 3, on which the jaws 5 and 6 can be moved to and fro. As can be seen, for example, in FIG. 3, a spindle 7 movable by a manually actuatable crank 9 serves to move the positionable jaw 6. The jaw 6 can be moved over larger distances by means of the spindle 7. As soon as the jaw 6 is in the desired position, it can be fixed with relation to the spindle 7 by means of clamping cams 11, which are disposed on both sides of the jaw.

Figure 3:
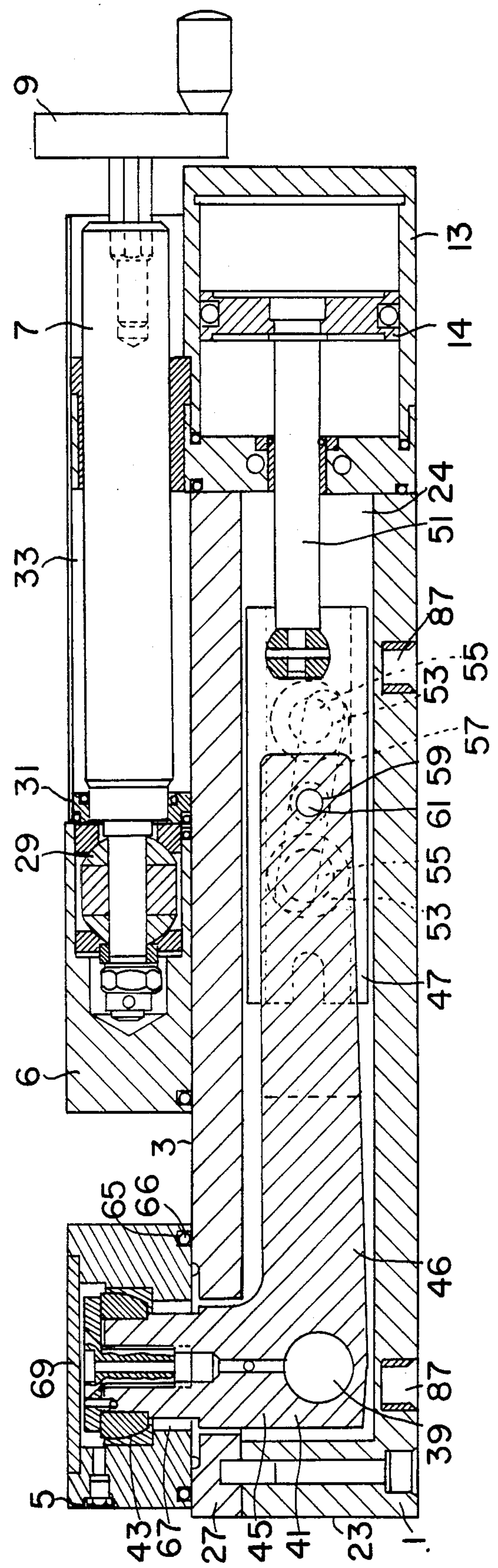
FIG. 3 is a longitudinal section through the version of the workpiece shown in FIG. 1, but without any mountable jaws.
Figure 4:
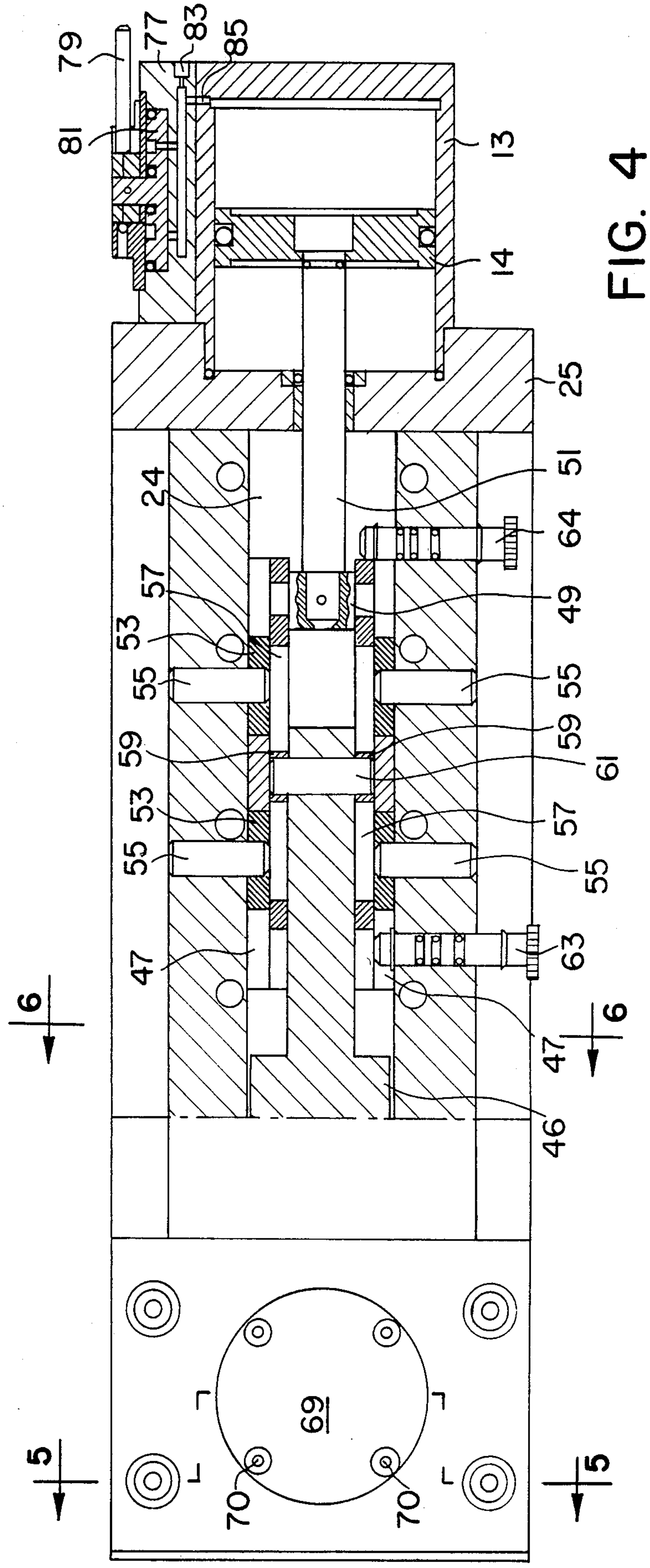
FIG. 4 is a plan view of the vise of FIG. 1, partially in section.
Figure 5:
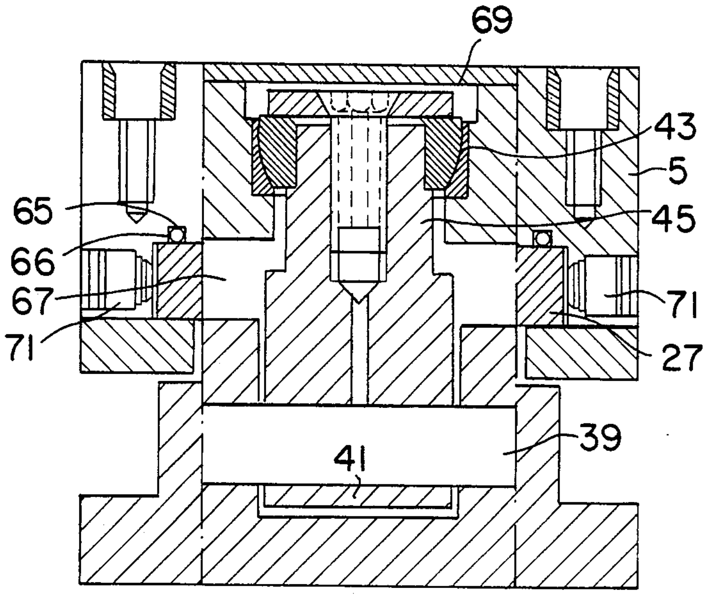
FIG. 5 is a cross-section of the vise along line V—V of FIG. 4.

The movable jaw 5 may be moved by means of a mechanism not illustrated in FIG. 1, but shown in FIGS. 3 and 4, for example by a drive member in the form of a pneumatic cylinder 13. It thereby traverses only a short path, which is sufficient, however, to clamp or loosen the workpiece 15. Jaws 19 and 21 mountable onto the jaws 5 and 6, respectively, by means of screws 17 are shown in FIG. 1, and serve to clamp the workpiece 15.

Figure 2:
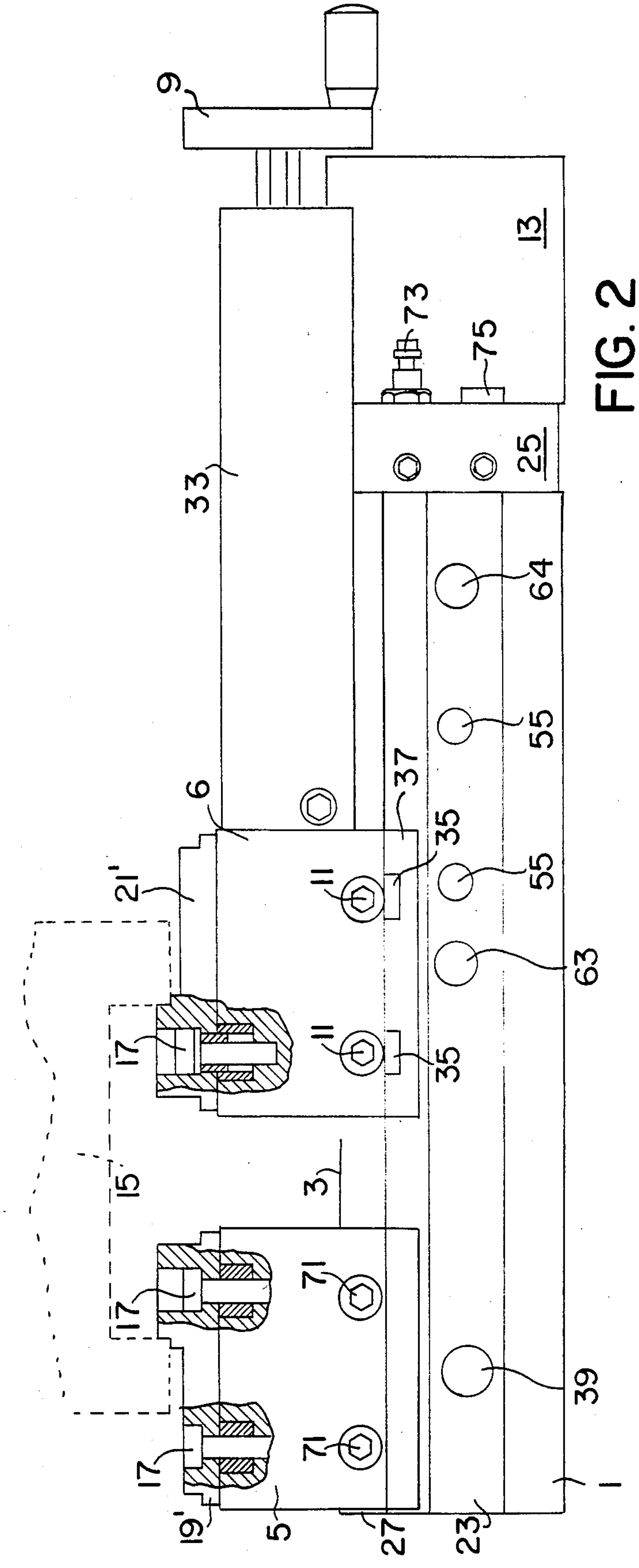
FIG. 2 is a side elevation view of the vise as shown in FIG. 1, but wherein the mountable jaws clamp on a workpiece on any internal sides thereof.

While the mountable jaws 19 and 21 shown in FIG. 1 serve to grip the workpiece 15 on its periphery, namely clamp it from the exterior, the mountable jaws 19' and 21' shown in FIG. 2 serve for clamping a workpiece 15' on any interior portions thereof.

Further details of construction of the vise can be ascertained from FIGS. 3 to 6. The support 1 consists substantially of a base body 23 of a vat-like shape, whose inner space 24 is closed off laterally by an abutment plate 25, and upwardly by a guide plate 27, or of a base body 23 of a box-like shape, whose inner space 24 is closed off laterally by the abutment plate 25. The stability of the base body 23 is substantially increased in this latter version.

As has already been stated with reference to FIG. 1, the jaw 6 may be moved along the support 1 by means of the spindle 7 through a manually actuatable crank 9. A double-acting base-plate socket 29 provided with a pressure plate 31 serves to support the spindle 7 axially in a longitudinal direction, the pressure plate 31 being screwed onto the jaw 6. The spindle 7, in turn, is protected by a U-shaped protective sheetmetal member 33. When the jaw 6 is in the desired position, the clamping cams 11 are turned. (See FIGS. 1 and 6). The wedges 35, which are disposed on bars 37 resting in a recess of the base body 23, are thereby slid in an inward direction, as each pin 34 is nestled in a slit 36 of a clamping cam 11. The jaw 6 is thereby pressed firmly against the sliding surface 3, and is maintained in that position.

A lever 41, best seen in FIG. 3, is disposed in the inner space 24 of the support 1, and is supported on the axle 39, the lever 41 being coupled by means of a joint 43 to the jaw 5. In the rest position the short lever arm 45 of the lever 41 subtends a right angle with the slide surface 3. This position represents a neutral position, from which the lever arm 45 prestresses the jaw 5 with respect to the slide surface 3, when moved in one or the other direction around the axle 39. Independently of the fact whether the vise is used for clamping a workpiece from the exterior (FIG. 1), or from the interior (FIG. 2), the jaw 5 is always prestressed in its clamped position with respect to the slide surface 3. Consequently in the clamped position no play occurs at any time between the jaw 5 and the slide surface 3.

Although it would be possible to form the lever 41 as a single lever, it is nevertheless more advantageous, as shown, to provide a two-armed lever, particularly an angle lever, which is formed with arms 45 and 46. The long lever arm 46 is substantially longer in the version shown than the arm 45, so that a corresponding transmission ratio is obtained.

In the version illustrated transmission coupling means, or a cam, are provided between the drive transmission means, namely the pneumatic cylinder 13, and the drive element, namely the angle lever 41. This transmission coupling means, or cam assumes the form of two sliders 47 disposed symmetrically with respect to the lever arm 46, which on one end thereof are connected to one another and to the piston rod 51 of the pneumatic cylinder 13 by means of a coupling member 49, best seen in FIG. 4.

The sliders 47 each have a U-shaped cross-section and travel on rollers 53, which in turn are supported in pairs on respective axles 55. Each slider 47 is formed with a slit 57 subtending an acute angle with the direction of movement, and within which a roller 59 can travel, which, in turn, is rotatably supported on a bolt 61 connected to the angle lever 41. If, therefore the sliders 47 are moved leftwardly by the piston rod 51, then the bolt 61 is moved downwardly by the slit 57, and consequently the angle lever 41 is pivoted in a clockwise sense, as is required for a closure movement in FIG. 1 for clamping the workpiece 15. As the slit 57 subtends an acute angle with the direction of movement, a self-braking action is inherent in this mechanism. Thus if no pneumatic pressure is exerted on the piston 14, the workpiece 15 nevertheless remains clamped. The elastic deformation of the angle lever 41 provides the necessary tensioning force far this purpose.

As shown in FIG. 4, two locking members 63 and 64 in the form of pins are provided, by means of which the path travelled by the sliders 47 can be limited. In FIG. 4 the pin 64 is shown in a locking position, so that only a movement of the jaw 5 in a direction of outer clamping (FIG. 1) can be performed by the drive transmission means, or member 13. For clamping from an inward direction (FIG. 2), the locking pin 63 is moved into the locking position, and the locking pin 64 is pulled out. These locking pins permit, on one hand, avoidance of too great a ventilating path, but ensure, on the other hand, that the jaw is firmly clamped against the slide surface in the clamping position.

The inner space 24 of the support 1 is filled with oil. So as to prevent any escape of oil between the slide surface 3 and the jaw 5, there are formed on the slide surface 3 of the support, or as shown in FIG. 3, on the support surface of the jaw 5 two recesses 65, which receive a seal 66. When the piston 51 penetrates the inner space 24, the piston pumps oil into a hollow recess 67 of the jaw 5, so that the slide surface 3 is lubricated within the region of the jaw 5.

Additionally the ball-and-socket joint 43 is also lubricated. So as to prevent escape of any oil from the jaw 5, a cover 69 is screwed onto the jaw 5 by means of screws 70, and thus covers the ball-and-socket joint 43.

Figure 6:
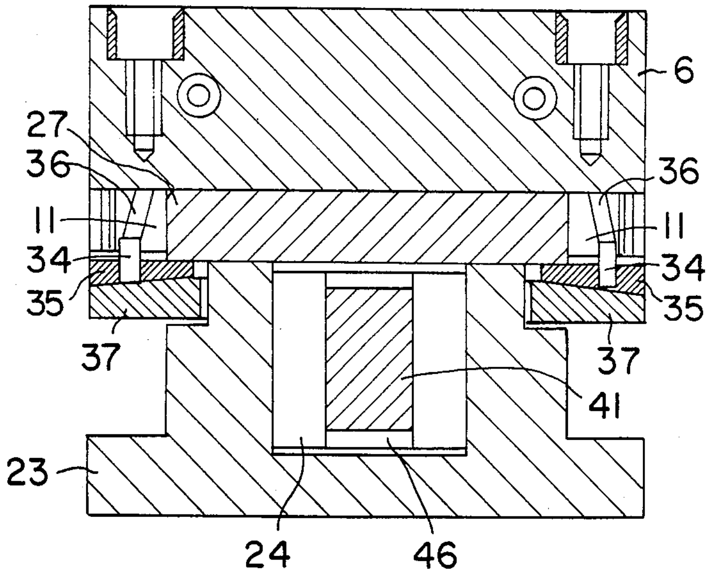
FIG. 6 is a cross-section of the vise along line VI—VI of FIG. 4.

The use of the ball-and-socket joint 43 permits the jaw 5 to execute not only a to and fro movement along the slide surface 3, but also permits the jaw 5 to execute a swivelling or rotating movement around an axis perpendicular to the slide surface 3 of the support 1. In that case the jaw 5 can, for example, be matched to a workpiece having non-parallel edges. If it is desired, however, that no such swivelling movement be performed, or that the swivelling or rotating movement be limited, then the positioning screws 71 can be suitably adjusted. (FIG. 1 and FIG. 6).

As can be seen from FIG. 1, a connector 73 for compressed air is provided on the support plate 25. A further bore for a second connection for compressed air is closed off by means of a plug 75. Two channels for compressed air formed in the interior of the support plate, but which are not further illustrated, lead to a control block 77 (FIG. 4), which includes a control slider 81 rotatable by a positioning lever 79. In the position shown in FIG. 4 compressed air is fed from the connection 73 to the cylinder 13 through the channels 83 and 84, the cylinder 13 then performing a closure movement for causing a workpiece to be clamped from the exterior. In a different position of the slider it is the other side of the piston 14 which is impacted on by the compressed air, so as to return the jaw 5 again to its original rest position. For the purpose of clamping a workpiece from the interior (FIG. 2), the piston 14 is impacted with compressed air in the reverse sequence.

The control slider 81 is formed so that when it is brought to a neutral intermediate position, remote control through a four-way valve is possible. For this purpose the closure plug 75 (FIG. 1) is replaced by a second pneumatic connection. By redirecting control of the valve, each side of the piston is then selectably impacted on by the compressed air through the pneumatic connections.

As shown in FIG. 3, the vise is formed with centering bores 87 on the base surface of the support 1. Advantageously four centering bores 87 arranged in a predetermined pattern are distributed along the base surface. This makes it possible to mark off the vise on support elements in a precisely reproducible manner, or to screw it onto support elements, provided these are formed with appropriate matching bores. Thus the vise can be used in a modular system. For use in operating machines having T-type recesses, special recess blocks are used for establishing a connection between the centering sleeves 87 and the T-shaped recesses.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A vise adapted to clamp a workpiece
comprising in combination
a support having a slide surface,
first and second jaws movable with respect to one another and operable to clamp the workpiece, at least one jaw being slidable along said slide surface,
a drive element in driving connection with at least said one jaw so as to at least move said one jaw into engagement with said workpiece,
said drive element including a lever supported on said support, and said drive element having a rest position, said lever extending substantially at right angles to said slide surface in said rest position,
a joint coupling said lever to said jaw,
drive transmission means operable to drive said drive element, and
stressing means for pressing said one jaw against said slide surface upon said drive element driving said one jaw into engagement with said workpiece.

2. The vise as claimed in claim 1, wherein said rest position is a neutral position, said lever, upon being moved in one direction, or in a direction opposite from said one direction away from said neutral position, pressing said one jaw against said support.

3. The vise as claimed in claim 1, wherein said lever is a double-armed lever.

4. The vise as claimed in claim 3, wherein said lever is an angle lever.

5. The vise as claimed in claim 1, further comprising coupling transmission means interposed between said drive element and said drive transmission means so as to transmit a driving force from said drive transmission means to said drive element.

6. The vise as claimed in claim 5, wherein at least one of said transmission means includes self-braking means.

7. The vise as claimed in claim 5, wherein said coupling transmission means includes two sliders disposed on respective opposite sides of said drive element, a first set of rollers being arranged on said support, said sliders operatively travelling on said first set of rollers, each slider having a longitudinal slit subtending an acute angle with said slide surface, said drive element including a second set of rollers in engagement with said longitudinal slit.

8. The vise as claimed in claim 5, wherein said coupling transmission means includes two sliders disposed on respective opposite sides of said drive element, glide means being arranged on said support, said sliders operatively travelling on said glide means, each slider having a longitudinal slit subtending an acute angle with said slide surface, said drive element including glide members in engagement with said longitudinal slit.

9. The vise as claimed in claim 8, wherein said glide means include a plurality of rollers.

10. The vise as claimed in claim 5, wherein said coupling transmission means travels along a certain path, and further comprising two selectably actuatable locking means to limit said path.

11. The vise as claimed in claim 1, further comprising rotation inhibiting means for limiting rotation of said one jaw on said slide surface.

12. The vise as claimed in claim 1, wherein said support is formed with a chamber adapted to be filled with oil.

13. The vise as claimed in claim 12, wherein said one jaw has a surface abutting said slide surface, at least one of said surfaces having at least one recess, and further comprising sealing means disposed in said recess.

14. The vise as claimed in claim 1, wherein said drive transmission means includes a pneumatic cylinder.

15. The vise as claimed in claim 14, further comprising control slider means having at least first and second positions and controlling the drive of said pneumatic cylinder so that the jaws are moved in one of said positions away from one another, and moved in the other of said positions towards one another.

16. The vise as claimed in claim 15, further comprising a four-way valve, and wherein said control slider means has a third position in which said pneumatic cylinder is controllable by said four-way valve.

17. The vise as claimed in claim 1, wherein said first and second jaws form a first set of jaws, and wherein each jaw has a front side and a top side, and is formed with bores arranged in a predetermined pattern on at least one of said sides, each bore having a predetermined diameter along a portion of its length, and being formed with an inner thread along at least a portion of the remainder of said length, and further comprising a second set of jaws, and fastening means substantially matching the formation of said bores so as to fasten said second set of jaws to said first set of jaws, respectively, on one of said sides.

18. The vise as claimed in claim 17, wherein fastening means include fastening screws, each matching said inner thread.

19. The vise as claimed in claim 17, wherein said fastening means include sleeves fitting into said bores, and screws introducable into said sleeves, each having a certain length, at least a portion of the length of each screw matching a corresponding inner thread.

20. The vise as claimed in claim 1, wherein said support has an underside, and is formed with bores arranged in a predetermined pattern on said underside, whereby said support is adapted to be mounted on a baseplate or the like.

21. The vise as claimed in claim 1, further comprising wedges in operative contact with the other jaw, and cam means actuating said wedges so as to press said other jaw against said slide surface and hold it thereagainst.

22. The vise as claimed in claim 1, wherein said joint is a ball-and-socket joint.

23. A vise adapted to clamp a workpiece comprising in combination
a support having a slide surface,
first and second jaws movable with respect to one another and operable to clamp the workpiece, at least one jaw being slidable along said slide surface,
a drive element in driving connection with at least said one jaw so as to at least move said one jaw into engagement with said workpiece,
drive transmission means operable to drive said drive element, said drive transmission means including self-braking means, and
stressing means for pressing said one jaw against said slide surface upon said drive element driving said one jaw into engagement with said workpiece.

24. The vise as claimed in claim 23, wherein said coupling transmission means includes two sliders disposed on respective opposite sides of said drive element, a first set of rollers being arranged on said support, said sliders operatively travelling on said first set of rollers, each slider having a longitudinal slit subtending an acute angle with said slide surface, said drive element including a second set of rollers in engagement with said longitudinal slit.

25. The vise as claimed in claim 23, wherein said coupling transmission means includes two sliders disposed on respective opposite sides of said drive element, glide means being arranged on said support, said sliders operatively travelling on said glide means, each slider having a longitudinal slit subtending an acute angle with said slide surface, said drive element including glide members in engagement with said longitudinal slit.

26. The vise as claimed in claim 25, wherein said glide means include a plurality of rollers.

27. The vise as claimed in claim 23, wherein said coupling transmission means travels along a certain path, and further comprising two selectably actuatable locking means to limit said path.

28. A vise adapted to clamp a workpiece comprising in combination
a support having a slide surface,
first and second jaws movable with respect to one another and operable to clamp the workpiece, at least one jaw being slidable along said slide surface,
a drive element in driving connection with at least said one jaw so as to at least move said one jaw into engagement with said workpiece,
drive transmission means operable to drive said drive element,
stressing means for pressing said one jaw against said slide surface upon said drive element driving said one jaw into engagement with said workpiece,
said suppport being formed with a chamber adapted to be filled with oil,
said one jaw having a surface abutting said slide surface, at least one of said surfaces having at least one recess, and
sealing means disposed in said recess.

* * * * *